US009934066B2

(12) United States Patent
Barraclough et al.

(10) Patent No.: US 9,934,066 B2
(45) Date of Patent: Apr. 3, 2018

(54) PRIORITY-BASED MANAGING AND SUSPENSION OF WINDOW PROCESSES IN A BROWSER APPLICATION

(71) Applicant: Apple Inc., Cupertino, CA (US)

(72) Inventors: Gavin Barraclough, Sunnyvale, CA (US); Samuel M. Weinig, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 14/727,703

(22) Filed: Jun. 1, 2015

(65) Prior Publication Data

US 2015/0347179 A1   Dec. 3, 2015

Related U.S. Application Data

(60) Provisional application No. 62/006,204, filed on Jun. 1, 2014.

(51) Int. Cl.
*G06F 9/48* (2006.01)
*G06F 9/50* (2006.01)
*G06F 17/30* (2006.01)

(52) U.S. Cl.
CPC .......... *G06F 9/4818* (2013.01); *G06F 9/4881* (2013.01); *G06F 9/5011* (2013.01); *G06F 17/30899* (2013.01)

(58) Field of Classification Search
None
See application file for complete search history.

(56) References Cited

U.S. PATENT DOCUMENTS

| 2014/0208328 A1* | 7/2014 | Chen | G06F 9/5022 |
| | | | 718/103 |
| 2015/0205462 A1* | 7/2015 | Jitkoff | G06F 3/0483 |
| | | | 715/777 |

OTHER PUBLICATIONS

Android; Android Developers, web.archive.org/web/20131017102732/http://developer.android.com/guide/components/fundamentals.html and web.archive.org/web/20131017103247/http://developer.android.com/guide/components/processesandthreads.html; Oct. 2013.*

* cited by examiner

*Primary Examiner* — Bing Zhao
(74) *Attorney, Agent, or Firm* — Fenwick & West LLP

(57) ABSTRACT

The method for managing a plurality of windows of a browser application on an electronic device includes assigning a priority level to each process, including the browser application, running on the device, and distributing computing resources based on priority level. In response to receiving an action to open a window, the browser application starts the execution of a process for opening the window, associates the process with the window, and assigns a priority level to the process associated with the window. The browser application then monitors an activity level of each process associated with its windows. If the activity level decreases, the browser application assigns the process with the decreased activity level to a lower priority level. If requested computing resources exceed a maximum threshold, a process is selected from the lowest priority level processes, and the selected process is suspended.

20 Claims, 11 Drawing Sheets

500

```
┌─────────────────────────────────────────────────────────────┐
│  Assign Priority Level To Each Of The Plurality Of Processes,│
│       One Process Comprising Browser Application             │
│                         505                                  │
└─────────────────────────────────────────────────────────────┘
                              │
                              ▼
┌─────────────────────────────────────────────────────────────┐
│ In Response To Receiving Action To Open Window Of Browser Application: │
│                         510                                  │
│  ┌───────────────────────────────────────────────────────┐  │
│  │       Start Execution Of Process For Opening Window    │  │
│  │                         515                            │  │
│  └───────────────────────────────────────────────────────┘  │
│  ┌───────────────────────────────────────────────────────┐  │
│  │              Associate Process With Window             │  │
│  │                         520                            │  │
│  └───────────────────────────────────────────────────────┘  │
│  ┌───────────────────────────────────────────────────────┐  │
│  │ Assign Priority Level From A Plurality of Priority Levels To Process │
│  │            Associated With Window With                 │  │
│  │  Priority Level Related To Priority Level Of Browser Application │
│  │                         525                            │  │
│  └───────────────────────────────────────────────────────┘  │
└─────────────────────────────────────────────────────────────┘
                              │
                              ▼
┌─────────────────────────────────────────────────────────────┐
│   Distribute The Computing Resources Among The Processes    │
│         Based On The Priority Level Of Each Process         │
│                         530                                  │
└─────────────────────────────────────────────────────────────┘
                              │
                              ▼
┌─────────────────────────────────────────────────────────────┐
│  Monitor Activity Level Of Each Process Associated With A   │
│  Window Of The Plurality Of Windows Of Browser Application  │
│                         535                                  │
└─────────────────────────────────────────────────────────────┘
                              │
                              ▼
                             (A)
```

Figure 5A

PRIORITY-BASED MANAGING AND SUSPENSION OF WINDOW PROCESSES IN A BROWSER APPLICATION

CROSS-REFERENCE TO RELATED APPLICATIONS

This application claims the benefit of U.S. Provisional Application No. 62/006,204, filed Jun. 1, 2014, the content of which is incorporated by reference in its entirety.

TECHNICAL FIELD

The present disclosure generally relates to a browser application managing and prioritizing separate window processes for each of its tabs or windows, and in particular, relates to priority levels associated with each window process based on the activity level of the corresponding tab or window.

BACKGROUND

A web browser application allows a user of a computing device to open multiple web pages simultaneously using multiple windows or tabs. If a user has multiple browser windows open, one or more of the open windows may be in the background view of the device display, rather than visibly been displayed in a foreground view. Despite being in the background view, these open windows still use computing resources of the device, since the browser application and its windows run as a single process on the device. In case the computer operating system of the device now requires additional computing resources, suspending background windows to free up resources would therefore require suspending the browser application and its foreground window. Thus, a monolithic browser application lacks the flexibility to adjust its demand on computing resources based on one or more of its background windows being inactive.

SUMMARY

A method for managing a plurality of windows of a browser application is disclosed. Each (browser) window is associated with a separate window process with each window process assigned to a priority level. The computer operating system maintains a process priority list ranking all running processes, including the window processes of the browser application, based on their priority level. Based on the activity level of each window process, the browser application monitors and reassigns each window process to a higher or lower priority level. The operating system uses the process priority list to select a process to be suspended if a shortage of computing resources occurs. In some embodiments, the process in the lowest priority level that has the earliest timestamp for being assigned to lowest priority level is selected for suspension. This methods allows for a more efficient manner of processing browser windows by individually managing separate processes for each browser window. The method allows for a browser window in background view to be suspended without suspending the browser window in the foreground view or the browser application itself.

The disclosed method for managing a plurality of windows of a browser application. The method includes that the computer operating system of an electronic device that has a plurality of computing resources assigns a priority level to each of a plurality of processes running on the electronic device. One of the processes includes a browser application. In response to receiving an action to open a window of the browser application, the browser application starts the execution of a process for opening the window and associates the process with the window. The browser application further assigns a priority level from a plurality of priority levels to the process associated with the window in response to receiving an action to open a window of the browser application. The assigned priority level relates to the priority level of the browser application. In the method, the computer operating system distributes the computing resources among the processes based on the priority level of each process.

The method further includes monitoring an activity level of each process associated with a window of the plurality of windows of the browser application. In response to detecting a decrease in the activity level of one of the monitored processes, the method includes assigning the monitored process with the decreased activity level to a lower priority level. In response to detecting a total amount of all computing resources requested by the processes exceeding a maximum threshold of the electronic device, a process is selected from the processes with the lowest priority level, and the selected process is suspended.

BRIEF DESCRIPTION OF THE DRAWINGS

FIGS. 5A and 5B are a flow chart illustrating a method for managing a plurality of windows of a browser application, in accordance with some embodiments.

Figure 1A:
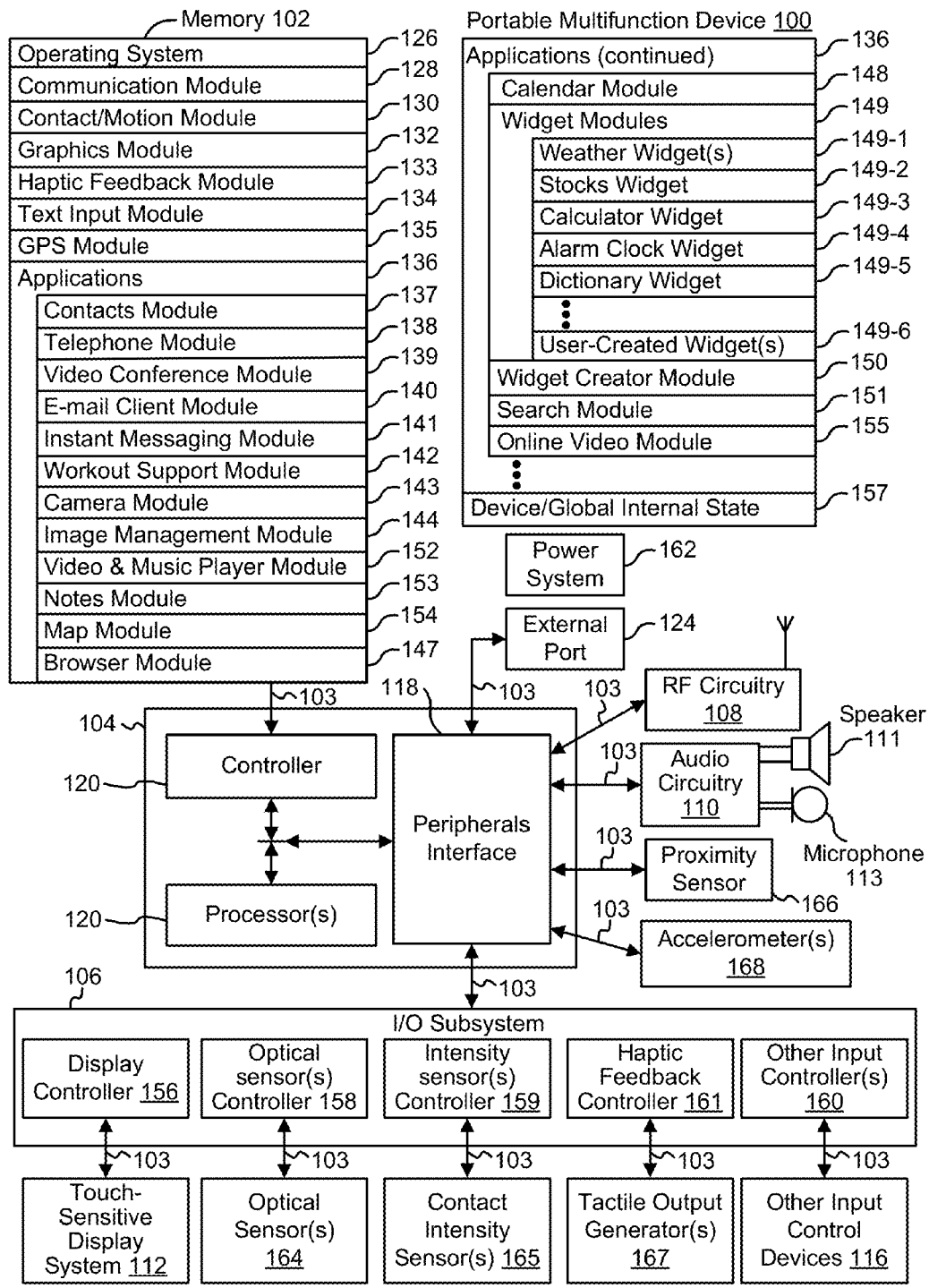
FIG. 1A is a block diagram illustrating a portable multifunction device with a touch-sensitive display, in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In embodiments described below, methods for managing a plurality of windows of a browser application are based on associating each window with a separate window process and assigning each window process to a priority level based on the activity level of the associated window. Processes, including the window processes of the browser application are ranked according to their corresponding priority level. This allows the computer operating system of the device to select a process from the lowest priority level to be suspended if computing resources are needed for other processes. In some embodiments, the browser application assigns the lowest priority level when a window process changes from the foreground to background view. This allows the computer operating system to suspend inactive background window process and more efficiently utilize its processing capabilities when running the browser application.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch sensitive surface such as touch-sensitive display system 112 of device 100). Device 100 optionally includes one or more tactile output generators 167 for generating tactile outputs on device 100 (e.g., generating tactile outputs on a touch-sensitive surface such as touch sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure sensitive tip of a stylus is, optionally, used to determine a pressure of the stylus on the touch-sensitive surface. Alternatively, the size of the contact area detected on the touch sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in 1/0 subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
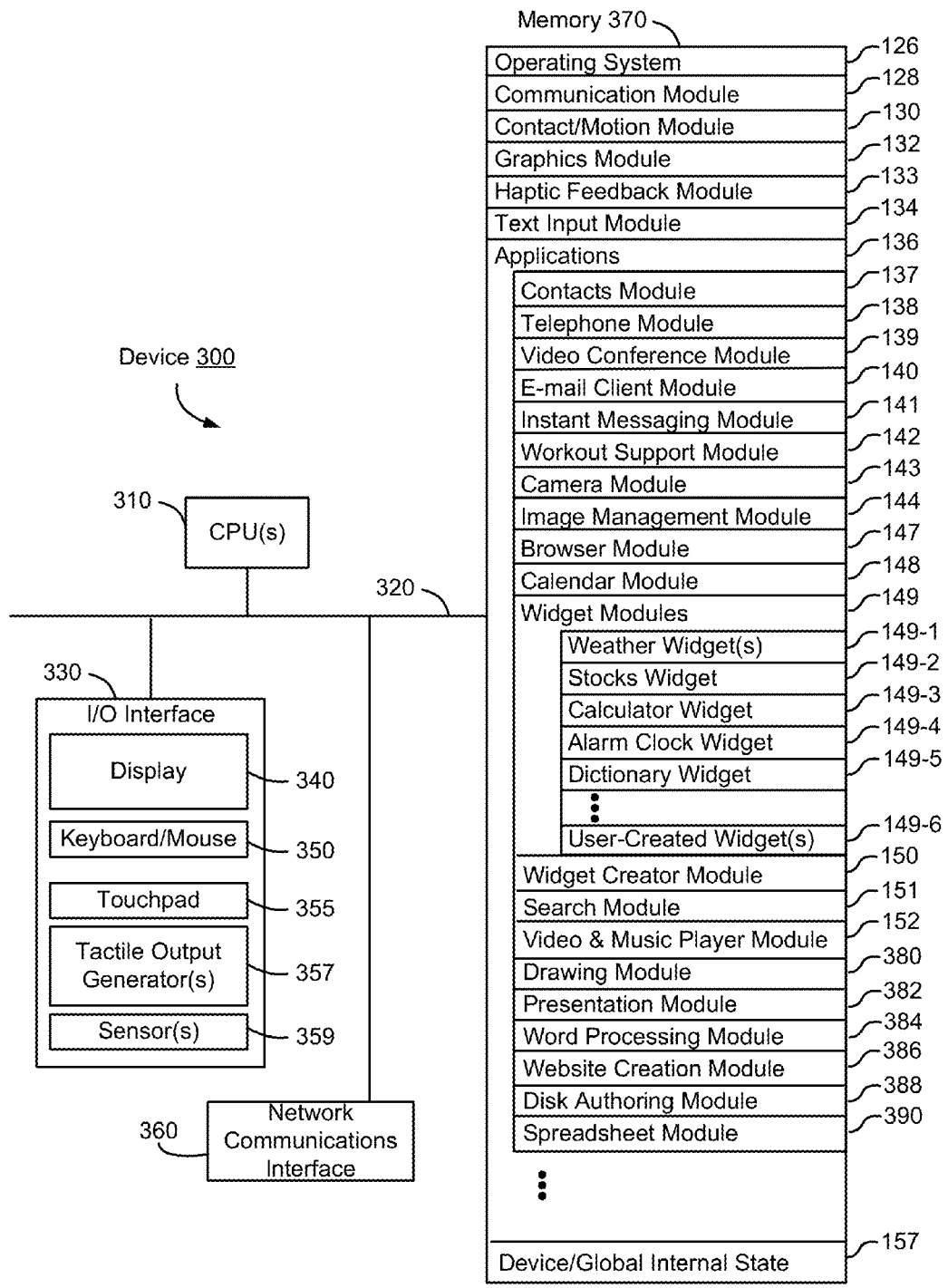
FIG. 3 is a block diagram of an exemplary multifunction device with a display and a touch-sensitive surface, in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
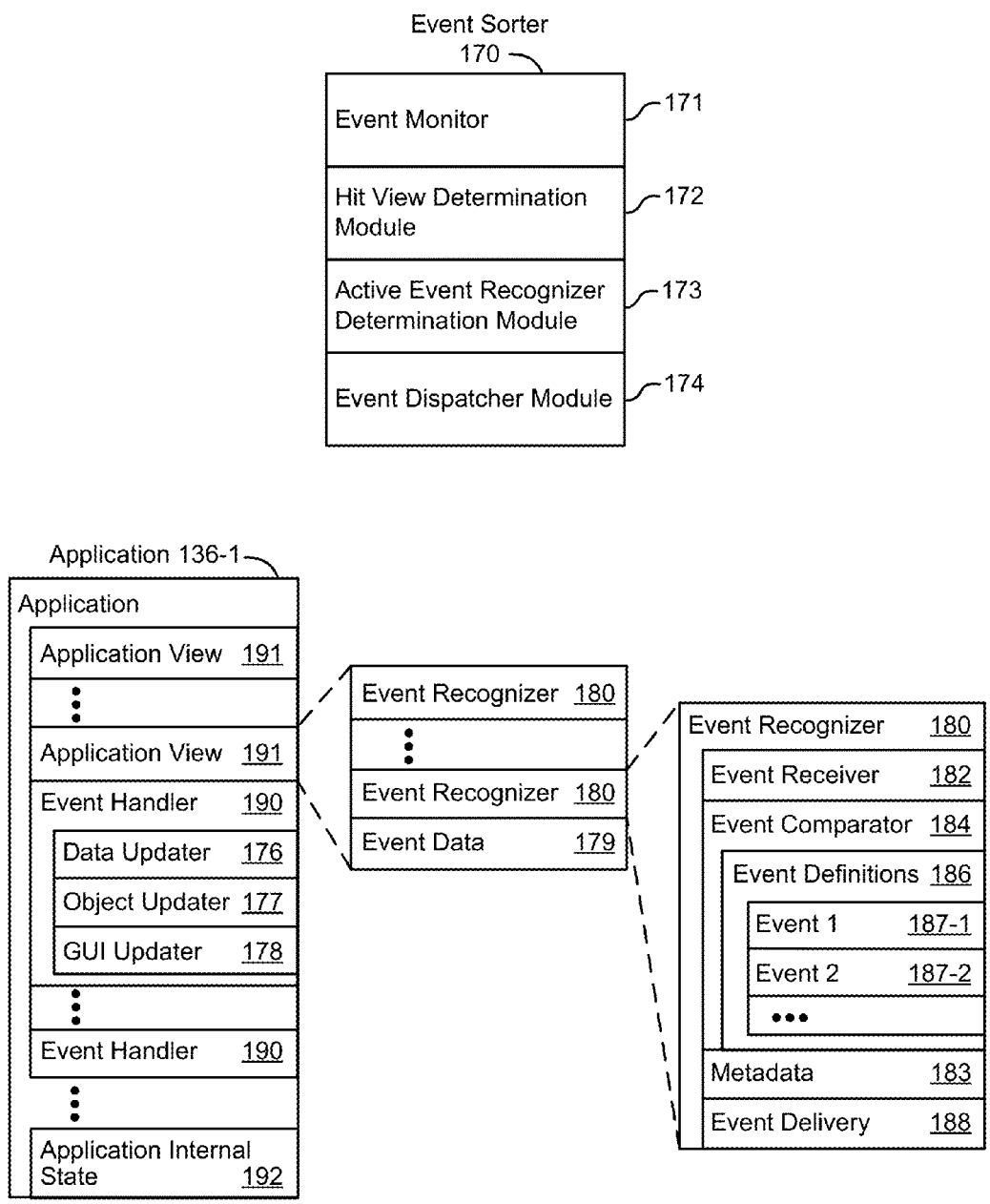
FIG. 1B is a block diagram illustrating exemplary components for event handling, in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
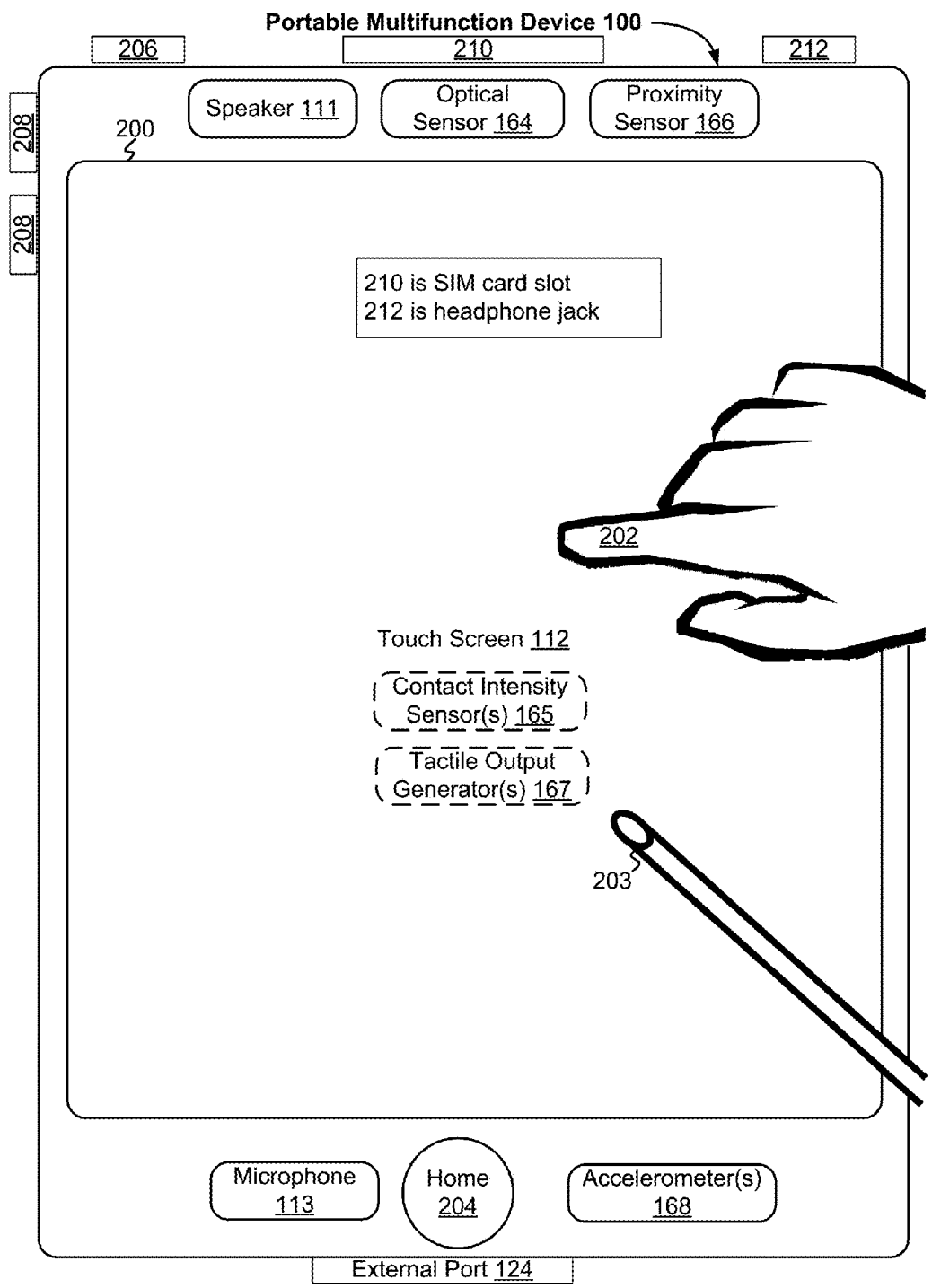
FIG. 2 illustrates a portable multifunction device having a touch screen, in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
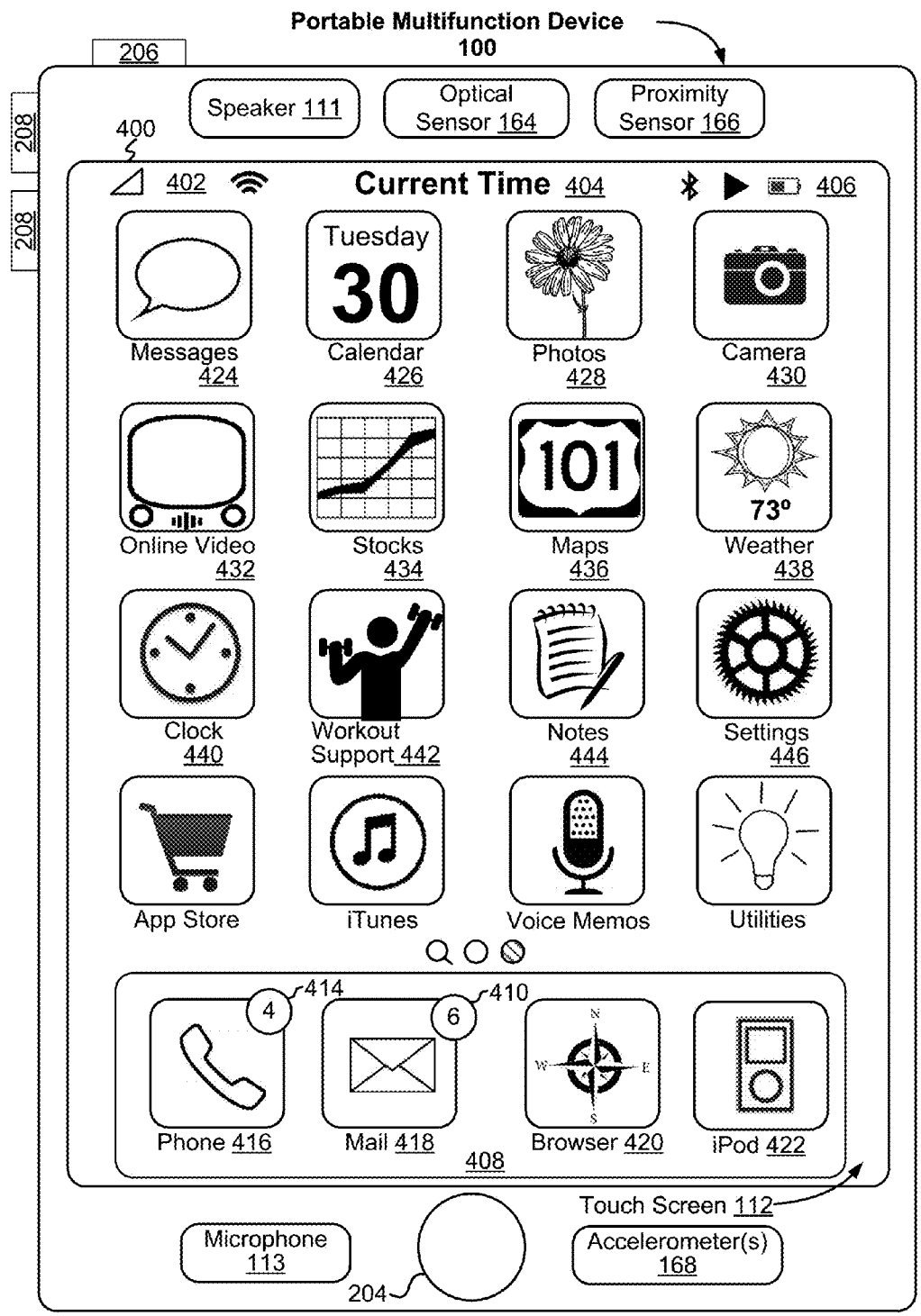
FIG. 4A illustrates an exemplary user interface for a menu of applications on a portable multifunction device, in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Text;"
  - Icon 426 for calendar module 148, labeled "Calendar;"
  - Icon 428 for image management module 144, labeled "Photos;"
  - Icon 430 for camera module 143, labeled "Camera;"

Icon 432 for online video module 155, labeled "Online Video"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
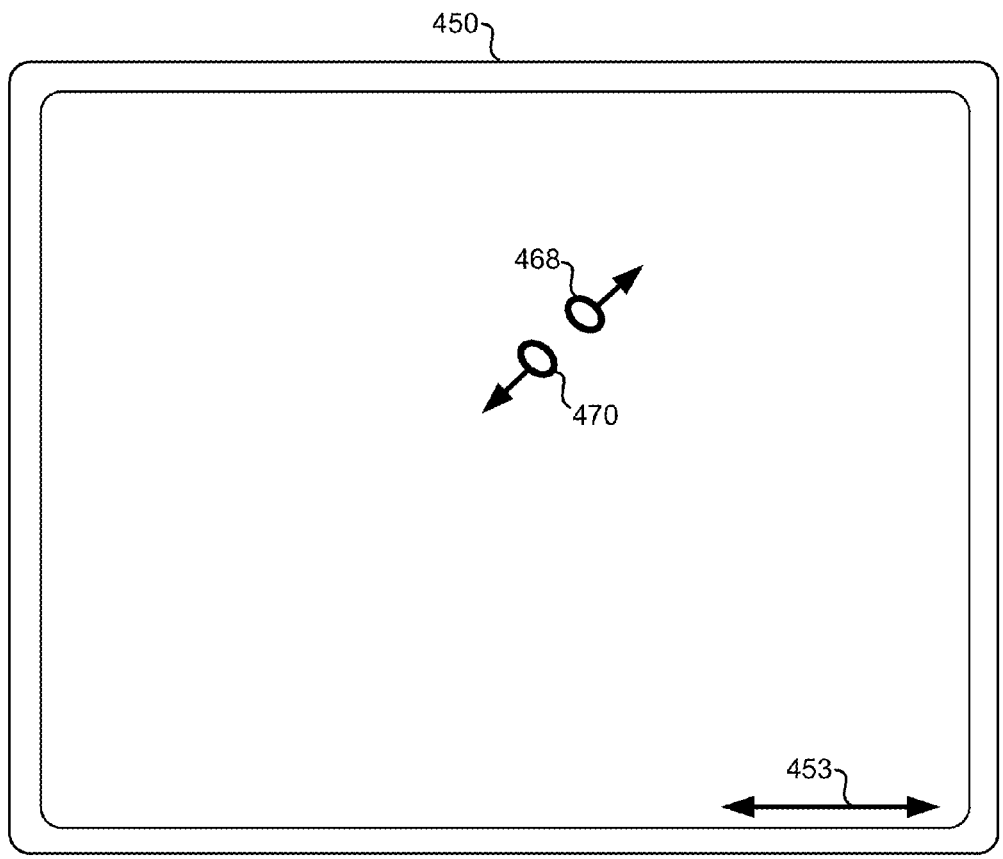
FIG. 4B illustrates an exemplary user interface on a device with a touch-sensitive surface that is separate from the display, in accordance with some embodiments.
Figure 4B:
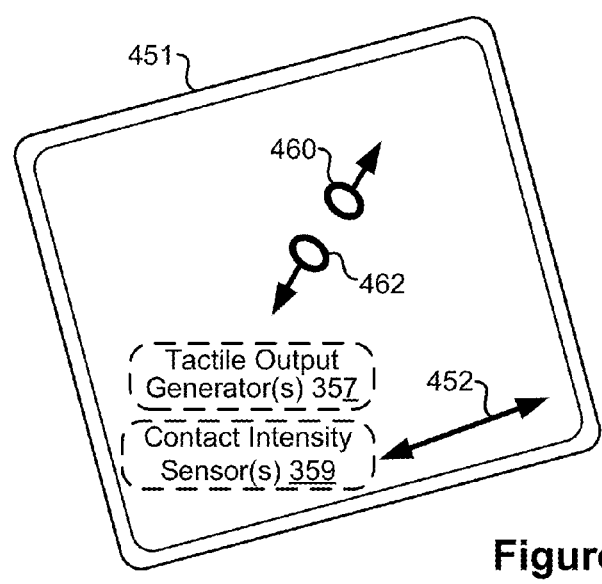

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Management System of Browser Window Processes

FIG. 5 is a flowchart illustrating a method 500 for managing a plurality of windows of a browser application in accordance with some embodiments. The method allows for separately processing actions by the user with a window of the browser application by starting a separate process for each opened window of the browser application. In turn, the browser application manages and monitors the processes of its windows. This includes that the browser application initially assigns a priority level to each process and upon detection of a decreased activity level of the process, assigning the process to a lower priority level. FIG. 5 is a flowchart illustrating a method for identifying background browser processes and inserting one or more of the background processes into a process termination queue for the operating system running the browser in accordance with some embodiments.

The method illustrated in FIG. 5A decreases memory usage and processing requirements by suspending inactive processes. Suspending inactive processes frees up processing capability of a device such that other processes can be performed. For battery-operated electronic devices, suspending inactive processes conserves power and increases the time between battery charges. Although the method is described with the operating system 126 of device 100 performing the depicted steps, in other embodiments, various other modules of a device such as device 100 perform the depicted steps.

The method 500 is performed at an electronic device 100 with a display 200 and an input device, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. In some embodiments, the display is a touch screen display and a touch-sensitive surface is on the display. In some embodiments, the display is separate from the touch-sensitive surface. Some operations in the methods are, optionally, combined and/or the order of some operations is, optionally, change. Some embodiments of the method 500 may include fewer, additional, or different steps than those shown in FIG. 5, and the steps may be performed in different orders. The steps of the method 500 are described with respect to example browser applications managing browser windows as illustrated in FIGS. 6, 7A and 7B.

Referring to FIGS. 5A, 5B, 6A, and 6B the process manager 604 as part of the computer operating system 126 assigns 505 a priority level to processes running on the electronic device 100, one of the processes comprising a browser application 601. The priority levels of all processes are stored in a process priority list 605. In some embodiments, the process manager 604 is a daemon process that runs in the background and manages all of the processes running on the electronic device 100. In some embodiments, the process manager 604 is responsible for launching and terminating applications on the electronic device 100. In some embodiments, the computer operating system includes the application manager 608 that is responsible for managing applications running on the electronic device 100. For example, the application manager 608 can place an application process in the background or foreground. An example of an application manager is the "springboard" module, which is an application that manages the "home screen," as illustrated in FIG. 4A, of electronic devices. In some embodiments, the computer operating system 126 includes a single process/application managing module combining the process manager 604 and the application manager 608.

Figure 6A:
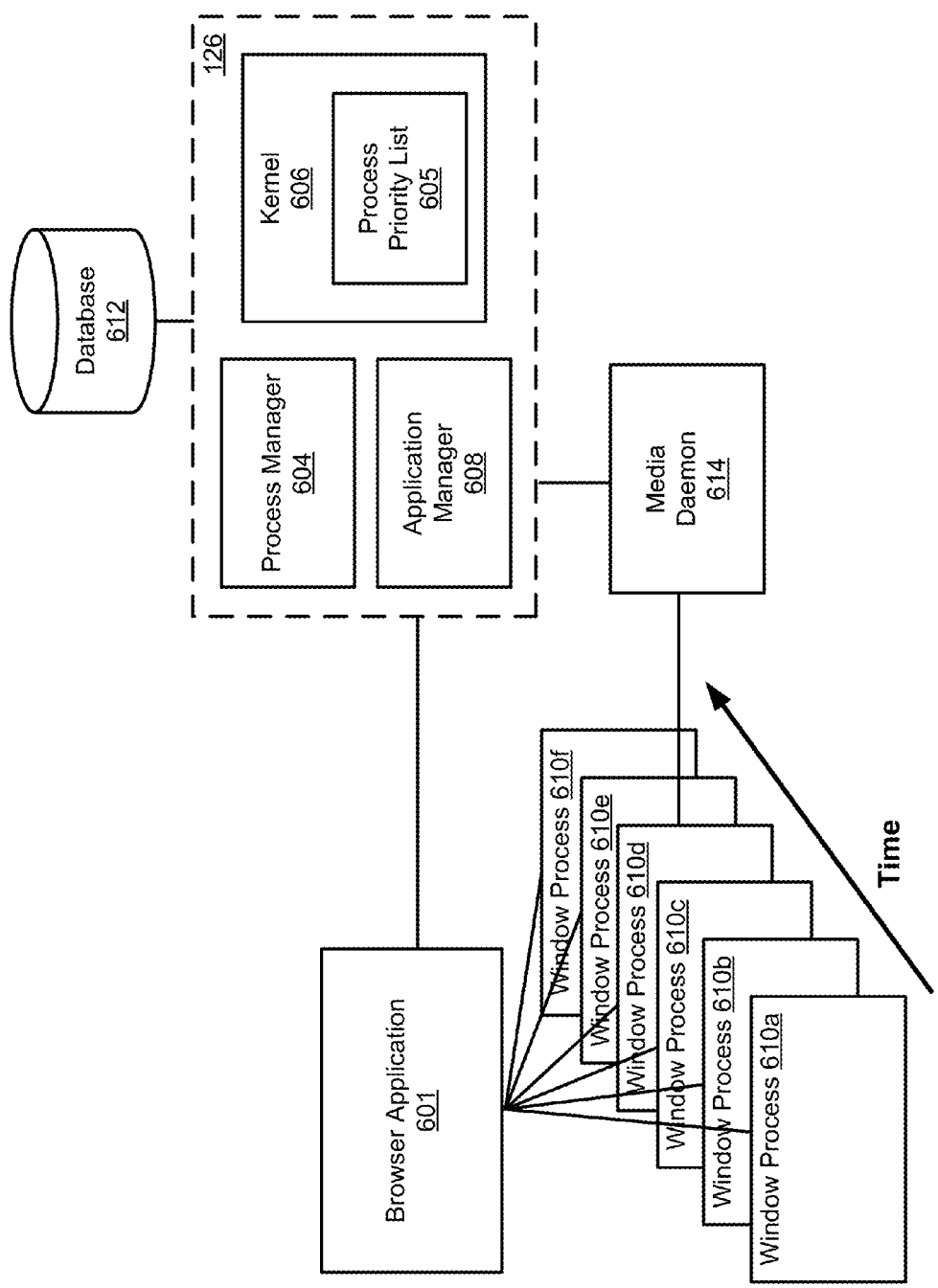
FIGS. 6A and 6B are block diagrams illustrating a browser application, window processes of the browser application, and other modules of the device, in accordance with some embodiments.
Figure 6B:
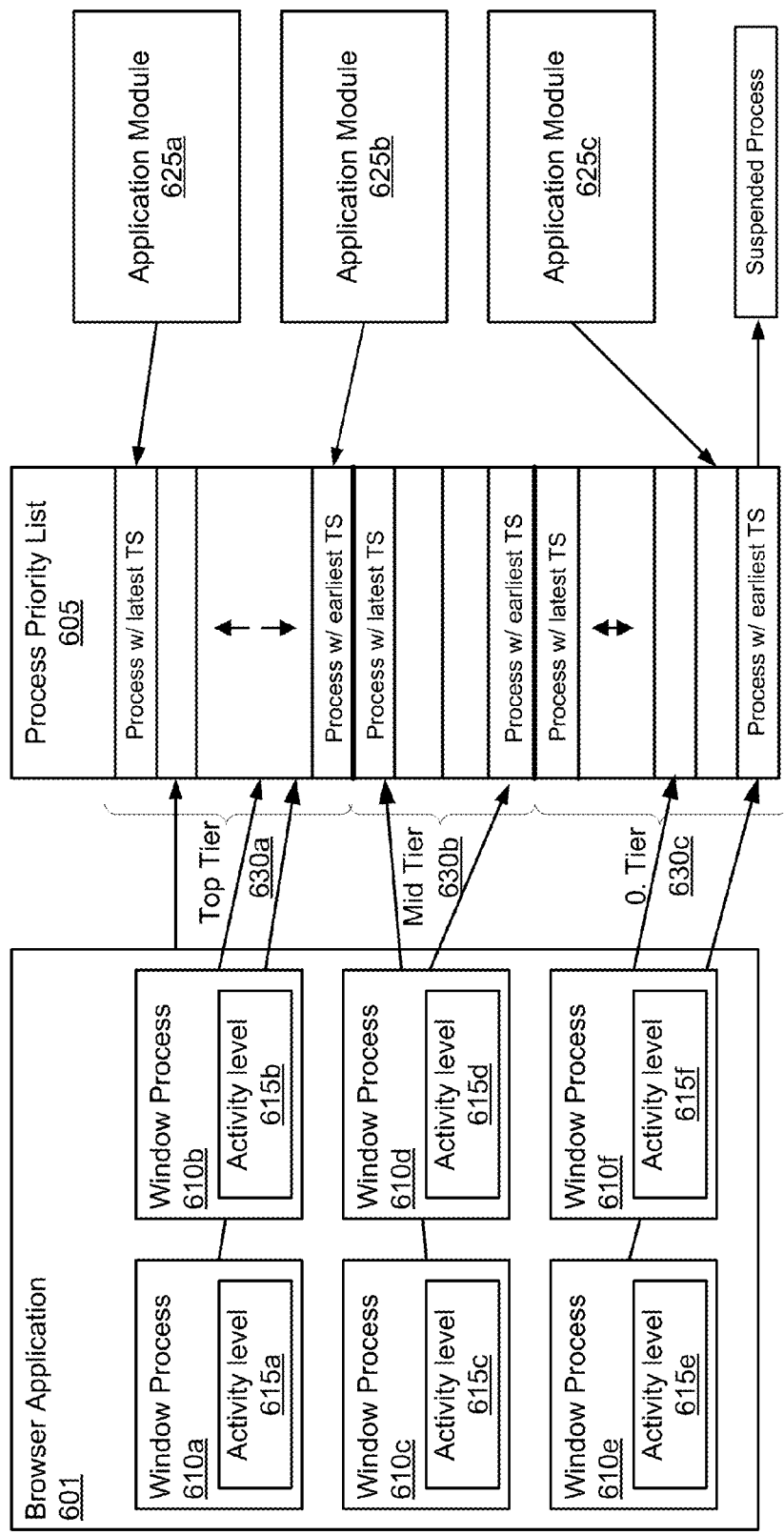

FIGS. 6A and 6B illustrate block diagrams of a computer operating system 126 and a browser application 601 that manages and monitors the processes 610 of its browser windows based on assigned priority levels 630, according to some embodiments. FIG. 6B illustrates the browser application 601, the process priority list 605, and one or more application modules 625. In some embodiments, the browser application 601 is the browser module 147 depicted in FIG. 1. The browser application 601 further includes one or more stand-alone window processes 610, each window process 610 further including an activity level 615. In some embodiments, the application modules 625 are the application modules described above with reference to FIG. 1. In some embodiments, as illustrated in FIG. 6B, the process priority list 605 includes a plurality of priority levels or tiers 630.

In some embodiments, the computer operating system 126 includes the kernel 606 among other modules. The kernel 606 manages system resources, such as the communication between hardware and software components. The kernel 606 allows other programs, such as the browser application 601 or media daemon 614, to use these system resources. In some embodiments, the system resources include one or more Central Processing Units (CPUs) or processing cores to run or execute programs, computer memory, and the other computing components as illustrated in FIG. 1A. For example, the kernel 606 manages the amount of memory that is allocated to a given process can use and determines what to do if not enough memory is available. In some embodiments, if not enough memory is available, the kernel 606 suspends one of the processes running on the electronic device 100. In some embodiments, the kernel 606 provides a page scanning process that searches for unused pages of memory (e.g., RAM) that can be reclaimed for other processes. In some embodiments, the kernel 606 includes the process manager 604 and/or application manager 608. In some embodiments, the kernel 606 includes the process priority list 605.

The process priority list 605 includes a list of all processes that registered with the computer operating system 126 or memory management system according to the priority level assigned to each process. Each priority level includes zero, one or more processes. A priority level is initially associated with a process upon the process start to execute/run on the electronic device. In some embodiments, the priority level of a process changes during the execution/run time of the process. In some embodiments, the computer operating system 126 reassigns the priority level of a process based on the activity level of the process, e.g., whether the process runs in the foreground or in the background. In some embodiments, the process priority list 605 is used to order and prioritize the various processes being run on a device, such as the electronic device 100. In some embodiments, the process priority list includes a plurality of propriety levels or tiers, which various processes are assigned to. In some embodiments, the process priority list 605 includes eleven total tiers, with tiers ten through four (T10-T4) assigned to foreground processes, tiers three through one (T3-T1) assigned to background processes, and tier zero (T0) assigned to processes that are tagged for being suspended in case of a computing resources shortage. In some embodiments, process priority list 605 includes three total tiers.

In some embodiments, as illustrated in FIG. 6B, the process priority list 605 includes three different priority levels, a top tier level 630a, a mid tier level 630b, and a zero or low tier level 630c. Each process is associated with one of the levels. In some embodiments, the processes within a priority level (tier) are ranked according to the time, when the process was associated with the priority level, from the latest time to the earliest time. In some embodiments, the priority of a process is determined by the computer operating system 126, including the kernel 606, the process manager 604, and the application manager 608, or an application, such as the browser application 601, managing the process. Some examples of processes that range from low priority to high priority include but are not limited to suspended processes, background processes, foreground processes and system processes. Typically, suspended processes are the lowest priority processes and system processes are the highest priority processes. Generally, it is desirable to suspend low priority processes before suspending high priority processes. In some embodiments, the computer operating system 126 employs a policy to suspend processes of the lowest priority level if system resources are required that exceed the amount of available system resources. This allows for a more coarse grain approach of managing system resources based on priority level. In some embodiments, this policy includes suspending processes according to the time that the process had been associated with the lowest priority level. Thus, the lowest priority level process with the earliest association time is suspended first. This allows for a more fine grain approach of managing system resources by suspending processes within a priority level from earliest to latest association time.

In response to receiving 510 an action to open a window of the browser application, the browser application 601 starts 515 execution of a process for opening the window, and associates 520 the process with the window. As illustrated in FIG. 6A, in some embodiments, the browser application 601 starts 515 one or more window process 610 at different times upon the user opening various web pages within the browser application. Each window process opens a different window, also referred to as browser window, which is displayed within a user interface of the browser application. For example, each window displays the content of a web page opened by the user within the browser application. In some embodiments, the action to open a window of the browser application includes an action to open a tab window within the browser application. In some embodiments, upon initially starting the browser application, the browser application 601 also start an initial window process. In some embodiments, the initial window process opens a default window within the browser application. In some embodiments, the default window is based on the recent browsing history associated with the browser application or specified by the user in a configuration setting of the browser application. In some embodiments, multiple web pages open within the browser application are all associated with a single process by the browser application.

Figure 7:
FIG. 7 illustrates an example user interface for a browser application, according to some embodiments, in accordance with some embodiments.

FIG. 7 illustrates a user interface of the browser application that includes multiple browser windows, according to some embodiments. The user interface of the browser application includes a web browser 705 that is displayed on the display 200 of the electronic device 100 described above with reference to FIGS. 1A, 2 and 4A. The web browser 705 further includes a URL bar 706, a new tab option 707, and one or more tab windows 710. A user of a computing device such as device 100 uses the web browser 705 to access web pages on the internet. In some embodiments, to access a certain web page, the user enters a URL into the URL bar 706. Responsive to the user entering a URL into the URL bar 706, the web browser displays a web page 720 associated with the URL. The tab window 710 and its content, e.g., the content of a web page, are displayed on the display 200 in a foreground view of the user interface of the browser application that is visible to the user. The window displayed in the foreground view is also referred to as the active window of the browser application. Responsive to the user selecting the new tab option 707, the web browser displays a new tab window 710 in the foreground view. In some embodiments, the new tab window includes a blank web page as the default window.

The other tab windows, including, e.g., the content of web pages, are placed in the background view of the user interface of the browser application. In some embodiments, the background view of the other tab windows is not visible on the display 200. Windows in the background view are also referred to as inactive windows. In some embodiments, the foreground view of the active window and background views of the inactive windows displays the active window in front of the inactive windows. In these embodiments, the user has the option to select one of the displayed windows (active and inactive) to move to the foreground view, while moving the currently active window to the background view.

Upon selection of a window to move to the foreground view, the selected window is visibly displayed within the user interface of the browser application, while the inactive windows are visibly hidden from the display. In some embodiments, major portions of the inactive windows are visibly hidden (i.e. invisible) in the user interface of the browser application, while a minor portion of these inactive windows are still visible within the browser's user interface. In some embodiments, as illustrated in FIG. 7, the tab portion of tab window 710A is visible, including a title of the tab window. In these embodiments, the user can move the invisible portions of inactive tab window 710A to the foreground view by contacting the visible tab on the display 200. In the example user interface illustrated in FIG. 7, the tab window 710B and the corresponding web page 720 are in the foreground view, and the tab window 710A and its corresponding web page are in the background view, which is visibly hidden (i.e., not visibly displayed on the display 200). In some embodiments, the web browser 705 includes more or fewer tab windows than are shown in FIG. 7.

In addition, in response to receiving 510 an action to open a window of the browser application, the browser application 601 assigns 525 a priority level from a plurality of priority levels to the process associated with the window, the priority level being related to the priority level of the browser application. As illustrated in FIG. 6B, in some embodiments, the browser application 601 assigns different priority levels to each window process. For example, window process 610b is assigned to a priority level of the top tier level, while window process 610a is assigned to the mid tier level. In some embodiments, upon initially starting the execution of a window process 610, the browser application assigns the window process the same priority level that the browser application has. In some embodiments, the browser application assigns the window process associated with an active window, i.e., a window in the foreground view, to the top tier level, and window process of any inactive window, i.e. a background window, to the zero tier level. In some embodiments, the browser applications assigns the window process to the mid tier level, when the associated window is changing from foreground to background view, and the window process is still performing bookkeeping tasks.

Bookkeeping tasks include, for example, finishing downloading the content of the web page displayed in the window that changed to an inactive status. Other examples of bookkeeping tasks include, but are not limited, to determining the use of system resources by the window process associated with the newly inactive window and releasing any allocated and unused resources. In some embodiments, upon completion of the bookkeeping task, the browser application assigns the window process, for which bookkeeping tasks were performed, from the mid tier level to the zero tier level or lowest priority level.

In some embodiments, the browser application also assigns a timestamp to a process when assigning a priority level to the process. The timestamp (TS) represents the time and date that the browser application assigns the priority level to the process.

In some embodiments, as illustrated in FIG. 6B, processes are ordered within a priority level of the process priority list 605 according to their timestamps (TSs). The processes with an earlier timestamp are ranked lower than processes with a later timestamp within the same priority level. Thus, the process with the earliest timestamp (TS) and assigned to a priority level is ranked lowest within the priority level, while the process with the latest timestamp (TS) and assigned to the same priority level is ranked highest within the priority level. Thus, processes are ranked based on the length of time for which the process has been assigned to a priority level. For example, a process that has been assigned to the zero tier level for 10 minutes is ranked lower than a process that has been assigned to the zero tier level for one minute.

As illustrated in FIG. 6B, other application modules 625 are also included within the process priority list 605. For example, application modules include the calendar module, the email module, the camera module, the calculator widget, the video and music player module, and like modules, applications, and widgets as described above. The application modules 625 are some or all of the application modules described above with reference to FIG. 1. In some embodiments, the process manager, application manager or kernel typically assigns these application modules to the top tier level. Upon the window corresponding to the application module changing from foreground view to background view, the priority level of the application module is assigned to a lower priority level. In some embodiments, the application module associated with an inactive window is assigned to the zero tier level. In some embodiments, each of the application modules 625 is associated with one or more processes with each process assigned to a particular priority level. The application modules and other processes compete with the browser application 601 for the computing resources of the device. Although three application modules 625 are shown in FIG. 6B, the electronic device can run more or fewer application modules in other embodiments.

The computer operating system 126 distributes 530 the computing resources among the processes based on the priority level of each process. Thus, in some embodiments, more computing resources are made available to process assigned to the top tier level. Furthermore, processes from higher priority level receive preference over lower priority level processes when distributing computing resources. This can lead to processes of lower priority level competing for resources, while higher priority level process have their needs for computing resources satisfied.

Following the execution of one or more window processes, the browser application 601 monitors 535 an activity level of each process associated with a window of the plurality of windows of the browser application. In some embodiments, as illustrated in FIG. 6B, each window process 610 includes an activity level. In some embodiments, the activity levels include the window process being active or inactive, i.e. the window associated with the window process being a foreground view or background view, respectively. In these embodiments, the browser application is configured to display a window in the foreground view and a plurality of windows in a background view. A decrease in activity of the monitored process then includes moving the window associated with the monitored process from the foreground view to the background view of the browser application.

In some embodiments, monitoring an activity level of a process associated with a window includes monitoring user actions with content displayed within the window. The content displayed within the window of the browser application includes a web page, as described in detail with respect to FIG. 7. Actions or interactions by the user with the content includes, for example, browsing links associated with the web page or scrolling the content of the web page within the window of the browser application. Another example of actions includes the browser process displaying animations on a web page.

In some embodiments, the user action includes starting the execution of a daemon while interacting with the content of a web page within a browser window. For example, the user clicks on a web link within a web page that directs the browser application to video and/or audio content, upon which the browser application starts the video and music player module as a daemon to play the video and/or audio content. In some embodiments, as illustrated in FIG. 6A, the browser application 601 links the daemon 614 with the process 610d associated with a window of the browser application. For example, the video and music player module is linked to the window process of the web page that included the link to the video and/or audio content. The monitored activity level of the linked process 610d depends the activity level of the daemon 614. In case of a media daemon, e.g., the video and music player module, the activity level includes activity of the daemon downloading and/or playing the video and/or audio content.

In response to detecting 540 a decrease in the activity level of one of the monitored processes, the browser application 601 assigns 545 the monitored process with the decreased activity level to a lower priority level. In some embodiments, detecting a decrease in activity level of a monitored process includes receiving no user action with the monitored process for a continuous time period. In some embodiments, if the continuous time period of no user action exceeds an inactive time threshold, the browser application assigns the monitored process to a lower priority level. In some embodiments, a process without user action for an extended time period is assigned to the zero tier level. In some embodiments, the browser application assigns a window process to a priority level based on the amount of decrease in activity level of the monitored process. For example, if the window process is still performing bookkeeping task while being moved to the background view, the browser application assigns the window process to the mid tier level and not the zero tier level, since the window process is still active. Upon completion of the bookkeeping task, the browser application assigns the window process to the zero tier level, since the window process is now inactive.

Finally, in response to detecting 550 a total amount of all computing resources requested by the processes exceeding a maximum threshold of the electronic device, the computer operating system 126 selects 555 a process from the processes with the lowest priority level, and suspends 560 the selected process. The method 500 advantageously allows the computer operating system to individually prioritize the window processes of the browser application over other processes that are associated with other application modules based on resource notification or request. For example, the kernel, process manager or application manager receives a resource notification or request to reduce memory usage, because the available memory of the device 100 is not sufficient to run all processes based on the memory requested by each process. In some embodiments, a resource notification or request to reduce memory usage is received, because the device 100 is entering a "sleep" or energy saving mode. In other embodiments, a resource notification or request to reduce memory usage is received for various other reasons. Upon receipt of a resource notification or request, the computer operating system selects a process included in the process priority list to be suspended, if the requested resources exceed the maximum threshold of available computing resources. In some embodiments, as illustrated in FIG. 6B, the operating system 126 through the kernel, the process manager, or the application manager, suspends the zero tier process with the earliest timestamp to preserve battery power, increase processing capability, or reduce memory usage.

In some embodiments, once a process to be suspended is selected, the process is suspended. In some embodiments, suspending the process comprises a full termination of the process, meaning the process is completely removed from the memory of the device. In some embodiments, suspending the process comprises pausing the process (or putting the process to "sleep"), but maintaining the process in the memory of the device. A full termination of the process maximizes the reduction of memory usage, while pausing the process allows the process to be resumed later. In some embodiments, a process continues running for a length of time to complete the execution of any pending tasks prior to being suspended. For example, a browser window process that is sending an email continues running for 10 seconds to complete, e.g., the task of uploading the email to a server before the process is suspended, to ensure that the email is properly sent. In some embodiments, suspending window process of the browser application includes closing the window associated with the window process.

The operations in the information processing methods described above are, optionally implemented by running one or more functional modules in information processing apparatus such as general purpose processors (e.g., as described above with respect to FIGS. 1A and 3) or application specific chips.

Figure 5B:
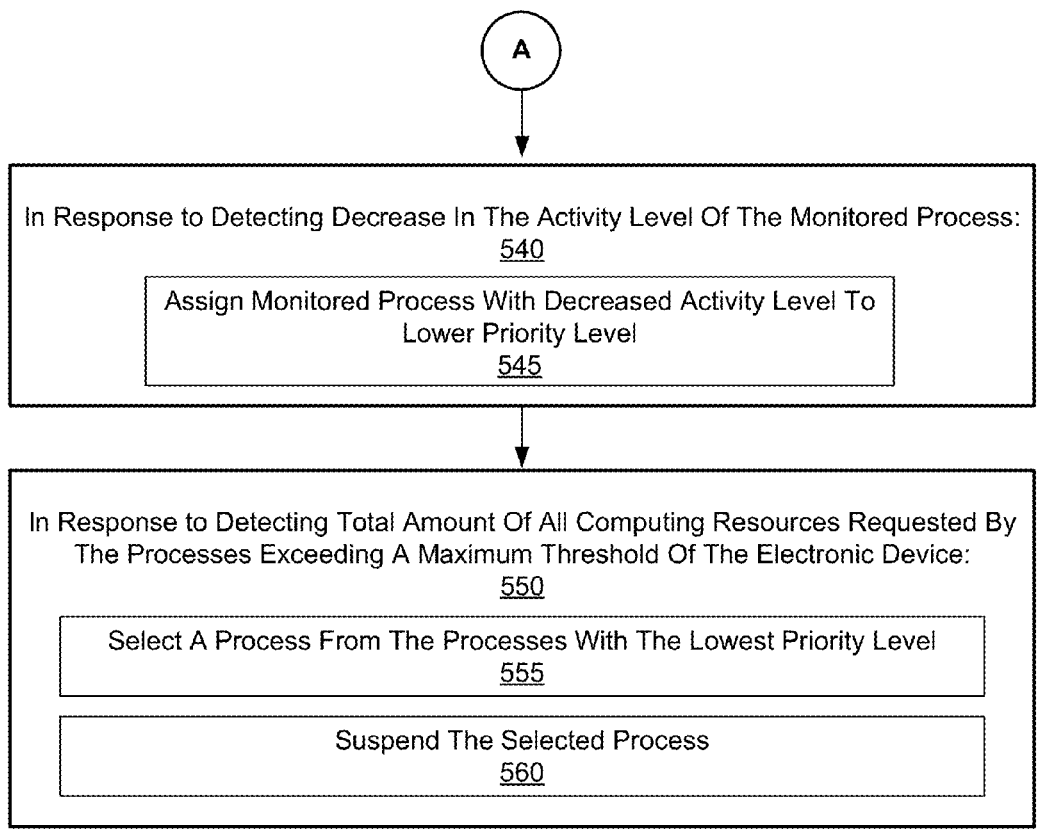

The operations described above with reference to FIGS. 5A, 5B, 6A and 6B are, optionally, implemented by components depicted in FIGS. 1A-1B. For example, the operations depicted in FIG. 5A and FIG. 5B are, optionally, implemented by the operating system 126 or other various modules depicted in FIG. 1.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for managing a plurality of windows of a browser application, comprising:
   at an electronic device having a plurality of computing resources and an operating system, the operating system:
      assigning a priority level to each of a plurality of processes running on the electronic device, one of the processes comprising a browser application;
      for each of a plurality of browser windows of the browser application, in response to receiving an action to open the window of the browser application:
         starting execution of a process for opening the window,
         associating the process with the window, and
         assigning a priority level from a plurality of priority levels to the process associated with the window,
         wherein for at least one priority level, a plurality of processes of different windows of the browser application are assigned to the same at least one priority level;
      for the at least one priority level in which the plurality of processes of different windows are assigned to the same at least one priority level, assigning a timestamp to each of the plurality of processes, the timestamp representing a time of when the at least one priority level was assigned to the corresponding process;
      distributing the computing resources among the processes running on the electronic device and the processes associated with the plurality of windows of the browser application based on the priority level of each process;
      monitoring an activity level of each of the plurality of processes associated with the plurality of windows of the browser application, wherein the activity level includes at least one of a central processing unit (CPU) activity level, a user activity with respect to the window of the browser application, and an activity level of a daemon associated with the browser application;
      in response to detecting a decrease in the activity level of one of the monitored processes, assigning the monitored process with the decreased activity level to a lower priority level; and
      in response to detecting a total amount of all computing resources requested by the processes exceeding a maximum threshold of the electronic device, selecting a process from the processes associated with the plurality of windows of the browser application with a lowest priority level and having an earliest timestamp assigned when the selected process was assigned with the lowest priority level, and suspending the selected process.

2. The computer-implemented method of claim 1, wherein the browser application is configured to display a window in a foreground view and a plurality of windows in a background view, and the decrease in activity level of the monitored process comprises moving the window associated with the monitored process from the foreground view to the background view of the browser application.

3. The computer-implemented method of claim 1, wherein monitoring an activity level of a process associated with a window comprises monitoring user actions with content displayed within the window.

4. The computer-implemented method of claim 3, wherein the content displayed within the window comprises a web page, and a user action with the content comprises an action to browse links associated with the web page or to scroll the web page within the window.

5. The computer-implemented method of claim 1, further comprising: starting execution of a daemon; and linking the daemon with a process associated with a window of the browser application, wherein the monitored activity level of the linked process depends on an activity level of the daemon.

6. The computer-implemented method of claim 5, wherein the daemon comprises a media daemon, and the activity level of the daemon comprises a download and/or play activity of the media daemon.

7. The computer-implemented method of claim 1, wherein the action to open a window of the browser application comprises an action to open a tab window within the browser application.

8. The computer-implemented method of claim 1, wherein the detecting a decrease in activity level of one of the monitored processes comprises receiving no user action with the monitored process for a continuous time period that exceeds an inactive time threshold.

9. The computer-implemented method of claim 1, wherein the assigning the monitored process with the decreased activity level to a lower priority level is based on an amount of decrease in activity level of the monitored process.

10. The computer-implemented method of claim 1, wherein the plurality of priority levels includes a first tier of priority levels assigned to foreground processes of the plurality of processes, a second tier of priority levels assigned to background processes of the plurality of processes, and a third tier of priority levels assigned to processes of the plurality of processes tagged for suspension in response to detecting that the total amount of all computing resources requested by the processes exceeds the maximum threshold of the electronic device.

11. The computer-implemented method of claim 1, wherein detecting the total amount of all computing resources requested by the processes comprises determining amounts of memory usage, battery power, and processing capability of the CPU for the processes.

12. A computer-readable non-transitory storage medium storing instructions that, when executed, cause an operating system executed by a processor, at an electronic device having a plurality of computing resources, to:
assign a priority level to each of a plurality of processes running on the electronic device, one of the processes comprising a browser application;
for each of a plurality of windows of the browser application, in response to receiving an action to open the window of the browser application:
start execution of a process for opening the window,
associate the process with the window, and
assign a priority level from a plurality of priority levels to the process associated with the window,
wherein for at least one priority level, a plurality of processes of different windows of the browser application are assigned to the same a least one priority level;
for the at least one priority level in which the plurality of processes of different windows are assigned to the same at least one priority level, assigning a timestamp to each of the plurality of processes, the timestamp representing a time of when the at least one priority level was assigned to the corresponding process;
distribute the computing resources among the processes running on the electronic device and the processes associated with the plurality of windows of the browser application based on the priority level of each process;
monitor an activity level of each of the plurality of processes associated with the plurality of windows of the browser application, wherein the activity level includes at least one of a central processing unit (CPU) activity level, a user activity with respect to the window of the browser application, and an activity level of a daemon associated with the browser application;
in response to detecting a decrease in the activity level of one of the monitored processes, assign the monitored process with the decreased activity level to a lower priority level; and
in response to detecting a total amount of all computing resources requested by the processes exceeding a maximum threshold of the electronic device, select a process from the processes associated with the plurality of windows of the browser application with a lowest priority level and having an earliest timestamp assigned when the selected process was assigned with the lowest priority level, and suspending the selected process.

13. The storage medium of claim 12, wherein the browser application is configured to display a window in a foreground view and a plurality of windows in a background view, and the decrease in activity level of the monitored process comprises moving the window associated with the monitored process from the foreground view to the background view of the browser application.

14. The storage medium of claim 12, wherein monitoring an activity level of a process associated with a window comprises monitoring user actions with content displayed within the window.

15. The storage medium of claim 14, wherein the content displayed within the window comprises a web page, and a user action with the content comprises an action to browse links associated with the web page or to scroll the web page within the window.

16. The storage medium of claim 12, wherein the action to open a window of the browser application comprises an action to open a tab window within the browser application.

17. The storage medium of claim 12, wherein the stored instructions that, when executed, further cause a processor to: start execution of a daemon; and link the daemon with a process associated with a window of the browser application, and wherein the monitored activity level of the linked process depends on an activity level of the daemon.

18. The storage medium of claim 17, wherein the daemon comprises a media daemon, and the activity level of the daemon comprises a download and/or play activity of the media daemon.

19. The storage medium of claim 12, wherein the plurality of priority levels includes a first tier of priority levels assigned to foreground processes of the plurality of processes, a second tier of priority levels assigned to background processes of the plurality of processes, and a third tier of priority levels assigned to processes of the plurality of processes tagged for suspension in response to detecting that the total amount of all computing resources requested by the processes exceeds the maximum threshold of the electronic device.

20. The storage medium of claim 12, wherein detecting the total amount of all computing resources requested by the processes comprises determining amounts of memory usage, battery power, and processing capability of the CPU for the processes.

* * * * *

UNITED STATES PATENT AND TRADEMARK OFFICE
CERTIFICATE OF CORRECTION

PATENT NO. : 9,934,066 B2
APPLICATION NO. : 14/727703
DATED : April 3, 2018
INVENTOR(S) : Gavin Barraclough and Samuel M. Weinig It is certified that error appears in the above-identified patent and that said Letters Patent is hereby corrected as shown below:

In the Claims

Column 32, Claim 12, Line 10, please replace "a least one", with --at least one--.

Signed and Sealed this
Twenty-fourth Day of September, 2019

Andrei Iancu
*Director of the United States Patent and Trademark Office*